(12) United States Patent
Chang et al.

(10) Patent No.: US 6,943,993 B2
(45) Date of Patent: Sep. 13, 2005

(54) MAGNETIC RECORDING HEAD WITH A SIDE SHIELD STRUCTURE FOR CONTROLLING SIDE READING OF THIN FILM READ SENSOR

(75) Inventors: Thomas Young Chang, Menlo Park, CA (US); Yingjian Chen, Fremont, CA (US); Jing Zhang, San Jose, CA (US); Heng Gong, Layton, UT (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 170 days.

(21) Appl. No.: 10/364,799

(22) Filed: Feb. 11, 2003

(65) Prior Publication Data

US 2004/0156148 A1 Aug. 12, 2004

(51) Int. Cl.[7] ................................................. G11B 5/39
(52) U.S. Cl. ....................................................... 360/319
(58) Field of Search ................................. 360/317, 319, 360/126, 324.1, 324.11, 324.12, 324.2

(56) References Cited

U.S. PATENT DOCUMENTS

| | | | |
|---|---|---|---|
| 6,029,339 A | 2/2000 | Chang et al. ............. 29/603.14 |
| 6,061,211 A | 5/2000 | Yoda et al. ............. 360/324.12 |
| 6,201,670 B1 | 3/2001 | Chang et al. ................ 360/317 |
| 6,285,532 B1 | 9/2001 | Sasaki .......................... 360/317 |
| 6,315,875 B1 | 11/2001 | Sasaki .......................... 204/192.34 |
| 6,317,288 B1 | 11/2001 | Sasaki .......................... 360/126 |
| 6,330,127 B1 | 12/2001 | Sasaki .......................... 360/126 |
| 6,353,511 B1 | 3/2002 | Shi et al. ....................... 360/126 |
| 6,353,995 B1 | 3/2002 | Sasaki et al. ............. 29/603.14 |
| 6,400,525 B1 | 6/2002 | Sasaki et al. ................ 360/123 |
| 6,407,891 B1 | 6/2002 | Chang et al. ................ 360/317 |
| 6,430,003 B1 | 8/2002 | Sasaki .......................... 360/126 |
| 6,430,010 B1 * | 8/2002 | Murdock ...................... 360/319 |
| 6,441,995 B1 | 8/2002 | Sasaki .......................... 360/126 |
| 6,452,756 B1 | 9/2002 | Sasaki .......................... 360/317 |
| 6,456,459 B1 | 9/2002 | Sasaki .......................... 360/126 |
| 6,466,419 B1 * | 10/2002 | Mao ........................ 360/324.12 |
| 6,603,642 B1 * | 8/2003 | Araki et al. .................. 360/324 |
| 6,665,152 B2 * | 12/2003 | Nemoto ....................... 360/319 |
| 6,680,829 B2 * | 1/2004 | Chen et al. ................... 360/319 |
| 6,680,832 B2 * | 1/2004 | Fontana, Jr. et al. ...... 360/324.2 |
| 6,700,760 B1 * | 3/2004 | Mao .......................... 360/324.2 |
| 6,738,233 B2 * | 5/2004 | Khizroev et al. ............ 360/319 |
| 6,738,234 B1 * | 5/2004 | Araki et al. .................. 360/324 |

* cited by examiner

Primary Examiner—Jefferson Evans
(74) Attorney, Agent, or Firm—Joshua C. Harrison, Esq.; Hogan & Hartson LLP

(57) ABSTRACT

Side shield structures magnetically shielding a read sensor to block side reading of tracks on a magnetic media. The read heads include bottom and top magnetic shield layers, a read sensor or magnetically sensitive element between the bottom and top magnetic shield layers, and a side shield assembly formed of magnetically shielding material positioned between the bottom and top magnetic shield layers and adjacent at least a portion of the read sensor. In current-in-plane embodiments, the side shield assembly includes a pair of side shields of magnetically shielding material adjacent a lower portion of the read sensor formed on a lower read gap. In current-perpendicular-to-plane embodiments, the side shield assembly includes a pair of side shields extending from the bottom magnetic shield adjacent lower sides of the read sensor and/or a pair of side shields extending from the top magnetic shield adjacent upper sides of the read sensor.

21 Claims, 4 Drawing Sheets

MAGNETIC RECORDING HEAD WITH A SIDE SHIELD STRUCTURE FOR CONTROLLING SIDE READING OF THIN FILM READ SENSOR

BACKGROUND OF THE INVENTION

1. Field of the Invention

The present invention relates generally to the field of magnetic read/write heads and magnetic data storage, and more particularly, to a shield structure for a shielding a read sensor in the lateral or cross-track direction to reduce side reading.

2. Relevant Background

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information. Data density is determined by the amount of data stored on an area of magnetic media and depends on how much area must be allocated to each bit. Data on magnetic media is often stored in a line or track. Magnetic media often have multiple tracks. In the case of disks, the tracks are nested annular rings with more bits per track and more tracks per disk increasing data density. Data density or areal density, therefore, is determined by both the bit length and by the width of the bit. To decrease bit size, head size is decreased by fabricating thin film read and write heads.

Ongoing, important goals of researchers in magnetic recording technology include producing disk drive read heads that achieve strong signals, providing accurate readback of those signals, minimizing noise interference, and providing very high areal density while controlling manufacturing costs. Unfortunately, some of these goals directly conflict with one another. For example, to achieve ever-higher areal densities, track widths on a disk become smaller necessitating that the components used to read and write data also become smaller, which makes manufacturing more difficult and expensive.

High density recording, such as over 100 Gbit/in2, requires a highly sensitive read head. At higher densities, resistance changes in the head originating from the giant magnetoresistive (GMR) effect are reduced based on the progressively smaller dimensions of the length of the read head. The GMR effect (as well as the MR effect) is the measure of changes in electrical resistance of magnetically soft material, with the GMR effect found specifically in thin film materials systems. In current-in-plane (CIP) read heads, electrical current flows between contacts parallel to the disk or media surface through a GMR element or a read sensor with changes in resistance detected by voltage changes (i.e., readback voltage or output signal). More sensitive read heads have current flows through the films or GMR elements perpendicular (CPP) to the long axis of the structure and normal to the disk or media surface. The sensitivity of the CPP read heads has recently been further enhanced by building CPP read head structures that utilize tunneling magnetoresistance (TMR) concepts in which electrons "tunnel" through very thin insulators based on the magnetization of layers above and below the insulator.

One problem associated with using CIP and CPP read heads is directly related to reduced track widths and head size. Side reading occurs when a read sensor receives noise or stray signals from tracks adjacent the track being read by the read sensor and has become a bigger problem as the tracks have been placed closer together. Traditional head design that uses a permanent magnet abutted junction is typically adequate for larger track widths but as the track widths decrease the magnitude of the output signal or readback voltage weakens while at the same time the unwanted signals from adjacent data tracks yields more and more severe interference. The increased side reading of the read sensor results in degraded read data integrity. Achieving a high recording density requires a narrow head track width while maintaining the readback voltage output. Presently, the magnetic read width decreases have not scaled linearly with reductions to very narrow track widths (such more than 50,000 tracks per inch (TPI)). For example, recent studies have shown an almost 30 percent reduction in physical read width from 0.16 micrometers to 0.11 micrometers while magnetic widths have only changed by a small fraction of this amount. Prior efforts to shield the read sensor, such as in the track direction, have not been entirely successful and have even caused a sharpening of the readback voltage waveform (as measured by PW50 which is a pulse width measurement made at a 50 percent voltage level of the readback pulse), while the goal is to reduce the pulse width measurement to provide a read head able to read narrow pulses having a minimum interaction with each other.

Hence, there remains a need for a read head capable of effectively reading narrower track widths or having a narrower read back width (MRW). Such a read head preferably would provide improved control over noise from adjacent tracks including effects of side reading and would produce reduced PW50 measurements and would be suitable for manufacture using existing technologies including existing lithography processes.

SUMMARY OF THE INVENTION

The present invention addresses the above problems by providing side shield assemblies or structures for providing magnetic shielding of a read sensor to at least partially block side reading of tracks on a magnetic media adjacent the track currently under the read sensor. Briefly, the read heads of the invention include bottom and top magnetic shield layers, a read sensor or magnetically sensitive element between the bottom and top magnetic shield layers, and a side shield assembly formed of magnetically shielding material positioned between the bottom and top magnetic shield layers and adjacent at least a portion of the read sensor.

In current-in-plane (CIP) embodiments, the read head includes bottom and top read gap layers formed between the read sensor and the bottom and top magnetic shield layers. The read head further includes a pair of electrical contacts between the read gap layers and contacting first and second sides of the read sensor for conducting electricity through the read sensor and typically, a pair of magnetic bias elements between the read gap layers adjacent the first and second sides of the read sensor formed of hard magnetic material. The side shield assembly includes a first layer of magnetically shielding material deposited on the bottom read gap layer adjacent the first side of the read sensor and a second layer of magnetically shielding material deposited on the bottom read gap layer adjacent the second side of the read sensor.

In current-perpendicular-to-plane (CPP) embodiments, the side shield assembly typically includes a first side shield and a second side shield extending a distance, e.g., a shielding distance, from the bottom magnetic shield layer.

The first and second side shields are often formed integrally with the bottom magnetic shield layer of the same soft magnetic alloy and are spaced apart to provide a gap for receiving the read sensor between the side shields. The read head further includes a bottom electrical contact layer deposited over the side shields and the bottom shield layer, a pair of read gap elements adjacent the sides of the read sensor over the bottom electrical contact layer, and a top electrical contact layer formed over the read gap elements and the read sensor. In some embodiments, additional side shielding is provided by third and fourth side shield elements that extend toward the first and second side shields from the top magnetic shield layer and adjacent the sides of the read sensor (or in some cases, the third and fourth side shields are provided without the first and second side shields). A pair of magnetic bias elements may be provided adjacent the sides of the read sensor and sandwiched between the bottom electrical contact layer and the read gap elements.

DETAILED DESCRIPTION OF THE PREFERRED EMBODIMENTS

The present invention is directed toward shield structure designs for reducing side reading in magnetic recording heads, toward read heads including side shielding assemblies, toward methods of making a side-shielded read head, and toward merged read/write heads and storage systems that incorporate the side shield designs. The read heads of the present invention include a magnetic shield structure or assembly that surrounds a read sensor in the lateral or cross-track direction. The inclusion of the side shield structures significantly reduces side reading by the read sensor which allows narrower read back width or the width of the read sensor (MRw) and reduces the readback pulse waveform as measured by PW50.

Significantly, the side shield structures of the present invention can be used with a variety of read head configurations (which can then be included with merged read/write heads) and is not limited to a specific read head design or read sensor type. In the following description, for example, side shield structures are described for use with current-in-plane (CIP) GMR read heads as well as with current-perpendicular-to-plane (CPP) GMR read heads (and more particularly, for CPP GMR read heads with tunnel magnetoresistive (TMR) structures and CPP GMR read heads with longitudinal hard bias). A number of side shield structures or assemblies are described for CPP GMR read heads and others will become apparent to those skilled in the arts once these embodiments are understood. Additionally, the read sensor used in each of the examples is the same, i.e., a bottom type spin valve GMR read element, but the read sensor utilized may be different and is not considered limiting of the invention. For example, read elements that are more complex with more or different material layers may readily be used with the side shield structures of the present invention. The important aspect is that the side shield structures are included in the read head to improve control over side reading of the selected read sensor, not the specific configuration of the read sensor or the materials included in the read sensor.

Figure 1:
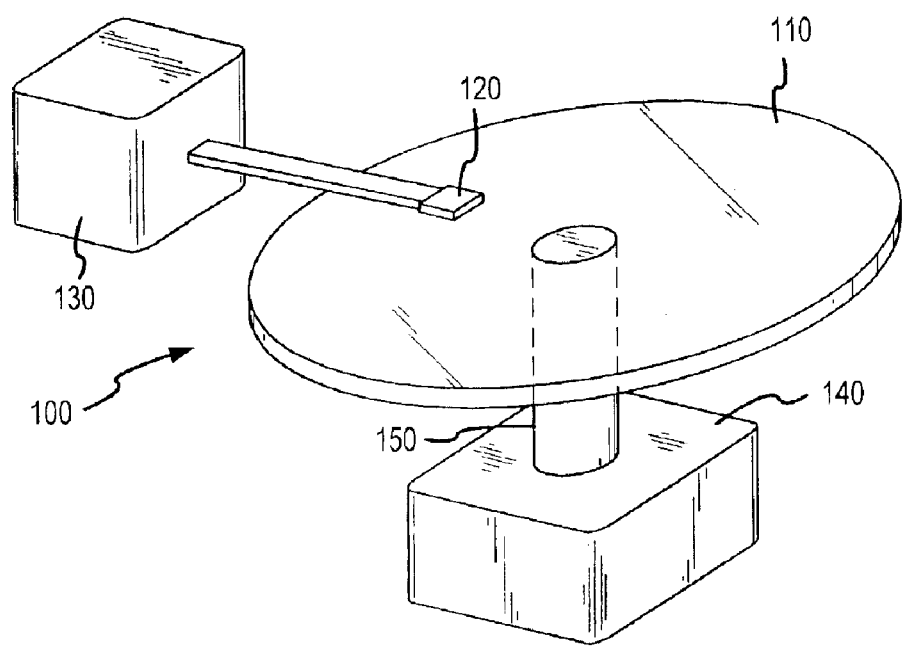
FIG. 1 illustrates a data storage and retrieval apparatus in which a read head with a side shield structure according of the present invention may be implemented, such as in a merged read/write head or other type of thin film magnetic recording head.

FIG. 1 shows a typical disk type magnetic data storage and retrieval apparatus 100 in which embodiments of the writer of the invention may be incorporated. The read head with side shield assembly of the present invention is located within a merged read/write head assembly 120 that rides above a magnetic storage media 110, depicted in FIG. 1 as a rotatable hard disk type storage media. The hard disk 110 is coupled to a motor 140 via a spindle 150 to provide rotation of the disk 110 relative to the head assembly 120. An actuating device 130 may be used to position the head assembly 120 above the surface of the media 110 to read and write data in the form of magnetic bits from and to the media 110. Of course, the data storage and retrieval apparatus 100 typically has several hard disks 110 and several corresponding head assemblies 120, not shown here for ease of description. The writer portion of the read/write head assembly 120 is not limiting to the invention and its configuration may vary significantly to practice the invention as long as the writer portion is combined with a side-shielded read head or reader portion as described below. Further, in some cases, a read head may be provided without a writer and the apparatus 100 would simply substitute such a read head constructed according to the invention for the read/write head assembly 120.

Figure 2:
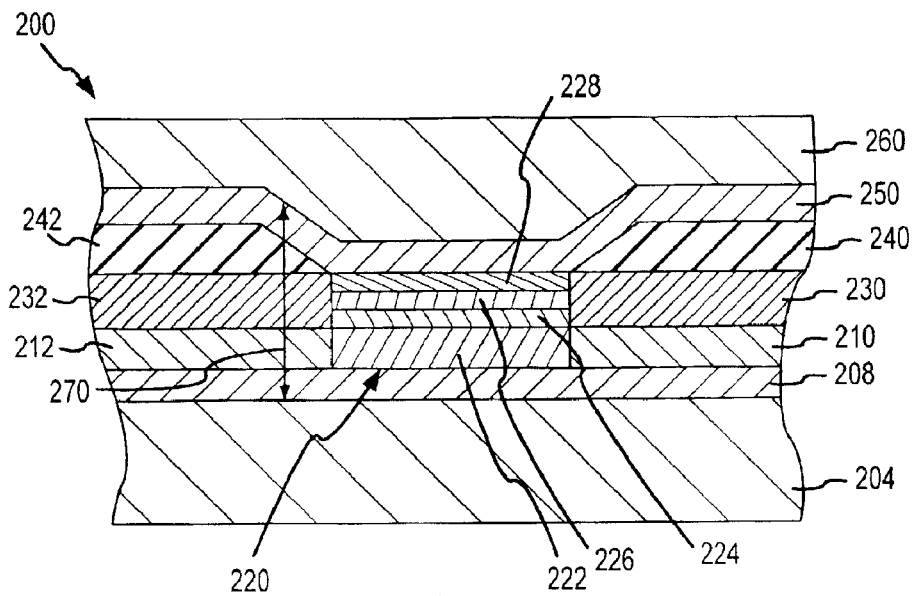
FIG. 2 is a sectional view of a current-in-plane (CIP) GMR read head with a conventional, no-side-shield design.

FIG. 2 illustrates a conventional design (i.e., a design without a side-shield structure of the invention) for a CIP GMR read head 200. The head 200 is shown in cross section as seen from the air bearing surface between the head 200 and a recording medium. As shown, the read head 200 includes a bottom (or first) magnetic shield layer 204 formed of a soft magnetic alloy, such as a NiFe alloy, a CoZrNb alloy, CoNiFe alloy, and the like, which is generally formed on a ceramic substrate (not shown), such as alumina. A bottom (or first) read gap layer or film 208 as an insulating layer is deposited over the bottom shield layer 204 and is typically formed of alumina, aluminum nitride, or materials with similar insulating properties. A read sensor 220 is built on the read gap film 208, and although a number of GMR and MR sensor element configurations can be used in the invention, is shown to include a four layer element. The four layers may provide a spin valve sensor 220 and include a pinning layer 222 (such as an anti-ferromagnet such as PdPtMn), a pinned layer 224 (such as a magnetic film of NiFe, CoFe, CoFeB, or the like), an interlayer 226 (such as a copper layer), and a free layer 228 (such as a magnetic film of NiFe, CoFe, CoFeB, or the like).

A top (or second) read gap layer or film 250 of soft magnetic material is deposited over the read sensor 220 and is typically formed of the same material chosen for the bottom read gap layer 208, i.e., alumina, alumina nitride, and the like. A top (or second) magnetic shield layer 260 is formed over the top read gap 250 with a soft magnetic alloy the same or similar to that of the bottom magnetic shield layer 204. Sandwiching the read sensor 220 are layers of non-magnetic underlayer material 210, 212 upon which is deposited domain control hard magnets 230, 232, such as CoCrPt films to create a hard bias and stabilize the domain structure in the free layer 222. Finally, a pair of electrical leads or contacts 240, 242 are placed on the bias layers 230, 232 and electrically connected to the sensor element 220 to allow current to pass through the sensor and changes in resistance to be detected. The side read gap or effective side gap is shown by arrow 270. The side gap 270 in the conventional read head 200 is generally the distance between the first and second (or bottom and top) magnetic shields 204, 260, and it is through this gap 270 (typically, on both sides of the head 200) that side reading from adjacent tracks on a magnetic media occurs and interferes with effective reading of the track under the read sensor 220.

Figure 3:
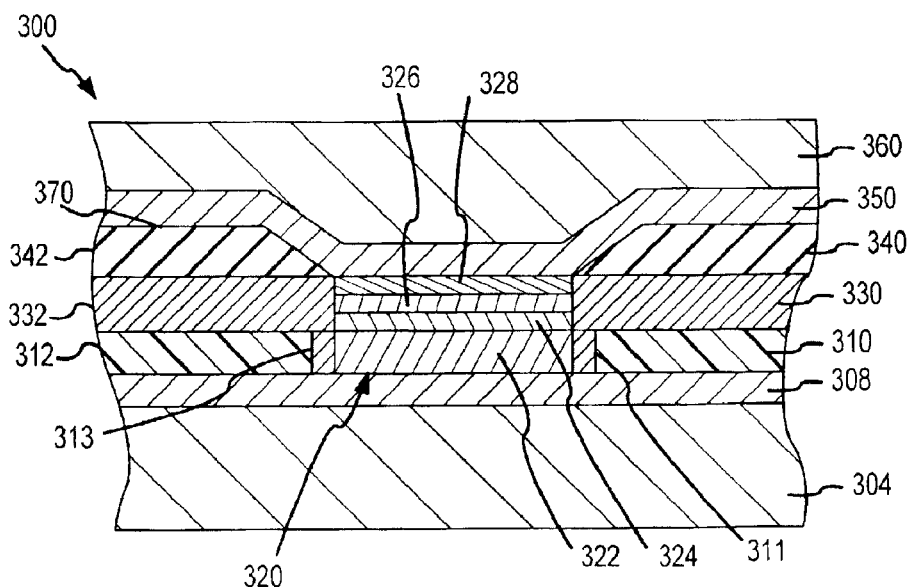
FIG. 3 is a sectional view of a CIP GMR read head constructed according to the present invention with an intermediate shielding layer or a side shield structure.

To reduce side reading, a CIP read head 300 of the invention shown in FIG. 3 is provided with a side shielding structure that reduces the effective read gap (as shown by arrow 370) such that noise from side reading of adjacent tracks is significantly reduced. According to the invention, the effective side gap 370 is a reduced portion of the space between the down track magnetic shields 304, 360 and is measured form a pair of intermediate or side shields 310, 312 that replace a portion of the non-magnetic underlayers 210, 212 of the conventional read head 200.

As shown, the read head 300 includes bottom and top magnetic shield layers 304, 360 with adjacent bottom and top read gap layers 308, 350. A read sensor 320 is provided between the read gap layers 308, 350 and may take a form similar to that of read sensor 220 having a pinning layer 322 (such as an anti-ferromagnet such as PdPtMn), a pinned layer 324 (such as a magnetic film of NiFe, CoFe, CoFeB, or the like), an interlayer 326 (such as a copper layer for CPP GMR embodiments and alumina oxide for TMR embodiments), and a free layer 328 (such as a magnetic film of NiFe, CoFe, CoFeB, or the like). Again, it should be noted that the configuration of the read sensor 320 may vary to practice the invention as side shielding according to the invention may be provided for nearly any magnetic read element design with beneficial effects.

The side shield structure or assembly of read head 300 includes first and second side shields 310, 312 formed on the bottom (or first) read gap layer 308 adjacent to the read sensor 320. The side shields 310, 312 are fabricated of soft magnetic material, often of the same material used for bottom and top shields 304, 360 but this is not necessary, such as a soft magnetic alloy, e.g., a NiFe alloy, a CoZrNb alloy, CoNiFe alloy, and the like. The thickness of this layer may vary and is typically selected to be as large as practical to maximize side shielding while being compatible with the formation of the hard bias or magnet layers 330, 332 and electrical leads or contacts 340, 342. For example, the side shields 310, 312 may be deposited at a thickness of previously used but not replaced non-magnetic underlayers (such as layers 210, 212 of head 200). Also, side spacers 311, 313 formed of a non-magnetic, metallic material are typically included adjacent the read sensor 320 to isolate the side shields 310, 312 from the pinning layer 322 or more generally, from the read sensor 320. The thickness of the side spacers 311, 313 may be about that of the side shields 310, 312 (as shown) or may be that of the side shields 310, 312 combined with the hard bias layers 330, 332.

Further, to facilitate fabrication, the side shields 310, 312 may be formed on the planar first read gap layer 308 to have a similar or the same thickness as the first layer of the read element 320 (e.g., the pinning layer 322 in the element 320 shown in FIG. 3) and further, to be coplanar with the top surface of this first layer. Alternatively, the side shields 310, 312 may be fabricated independently of the read sensor 320 (or be formed to coplanar with different ones of the layers of the element 320 to provide a desired shield thickness) to provide a desired side shield thickness adjacent the sides of the read sensor 320. In this case, the shields 310, 312 are planar devices arranged normal to the ABS with a thickness providing the shielding of the read sensor 320 from adjacent tracks.

Figure 4:
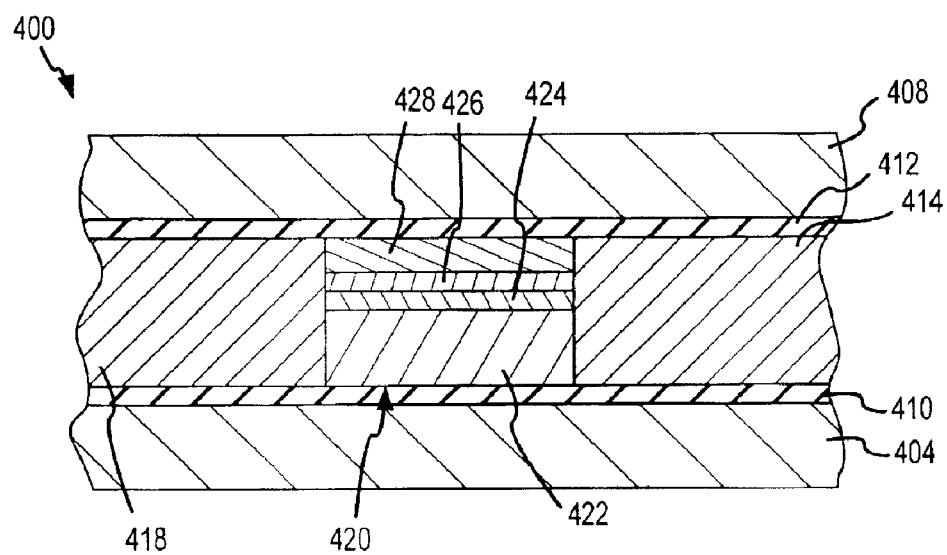
FIG. 4 is a sectional view of a current-perpendicular-to-plane (CPP) GMR read head with a conventional, no-side-shield design.

FIG. 4 illustrates a conventionally designed CPP read head 400 with a TMR structure or CPP GMR structure. As with CIP head 200, the CPP read head 400 includes a bottom (or first) shield layer 404 and a top shield layer 408 fabricated of a material, such as a soft magnetic alloy, e.g., a NiFe alloy, a CoZrNb alloy, and the like, for providing magnetic shielding inline with a track being read by the head 400. A read sensor 420 is sandwiched between the shields 404, 408 with electrical contact or lead layers 410, 412 provided on each shield 404, 408 to direct electricity through the sensor (i.e., perpendicular to the plane of the sensor layers). The read sensor or element 420 is again shown to be a four-layer element having a pinning layer 422 (such as an anti-ferromagnet such as PdPtMn), a pinned layer 424 (such as a magnetic film of NiFe, CoFe, CoFeB, or the like), an interlayer 426 (such as a copper layer for CPP GMR embodiments and alumina oxide for TMR embodiments), and a free layer 428 (such as a magnetic film of NiFe, CoFe, CoFeB, or the like). Adjacent the read sensor 420 is a pair of read gap elements or layers 414, 418 fabricated of an electrically insulating material such as alumina, alumina nitride, or other dielectric material and defining a read gap on each side of the read sensor 420. In the head 400, this read gap or effective side gap is basically the distance between the two shields 404, 408 that provide a space or path for side reading of tracks adjacent the track underneath the read sensor 420.

Figure 5:
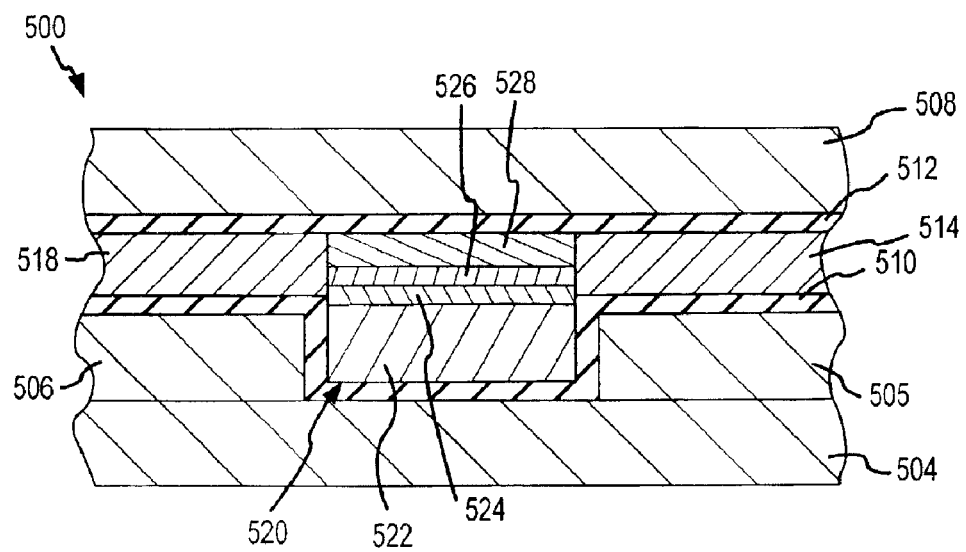
FIG. 5 is a sectional view of a CPP GMR read head constructed according to one embodiment of the invention with side shielding for a read sensor provided by shield extensions or extending thickness of the bottom shield.

FIGS. 5–8 illustrate a number of embodiments of CPP read heads in which side shielding structures are provided to reduce the size of the effective side gaps while still including adequate read gap materials. Referring first to FIG. 5, a CPP read head 500 is provides that includes a bottom and a top shield 504, 508, a pair of electrical contact or lead layers 510, 512, and a read sensor 520 including a pinning layer 522 (such as an anti-ferromagnet such as PdPtMn), a pinned layer 524 (such as a magnetic film of NiFe, CoFe, CoFeB, or the like), an interlayer 526 (such as a copper layer for CPP GMR embodiments and alumina oxide for TMR embodiments), and a free layer 528 (such as a magnetic film of NiFe, CoFe, CoFeB, or the like). Read gap elements 514, 518 are provided but, significantly, the effect side gap defined in part by these elements 514, 518 is reduced compared with the convention head 400 because of the addition of side shield elements 505, 506 (or bottom shielding extensions) adjacent a bottom portion of the read sensor 520.

As shown, the side shield elements 505, 506 are formed as an integral part of the bottom shield 504 and typically are formed of the same magnetically insulating material, such as a soft magnetic alloy, e.g., a NiFe alloy, a CoZrNb alloy, CoNiFe alloy, and the like, to provide shielding from noise from tracks adjacent to the track currently being read. In other embodiments (not shown), the side shield elements 505, 506 are formed of a differing material that is deposited on the bottom shield 504 after its top surface is planarized but prior to depositing the electrical lead layer 510. The thickness of the side shield elements determine the amount of shielding provided and is shown to be about the thickness of the pinning layer 522 of the read sensor 520 although this is not a limitation as the thickness may be greater as long as proper insulation of the leads 510, 512 is maintained or may be less and still achieve an amount of useful reduction in side reading by the read sensor 520.

Figure 6:
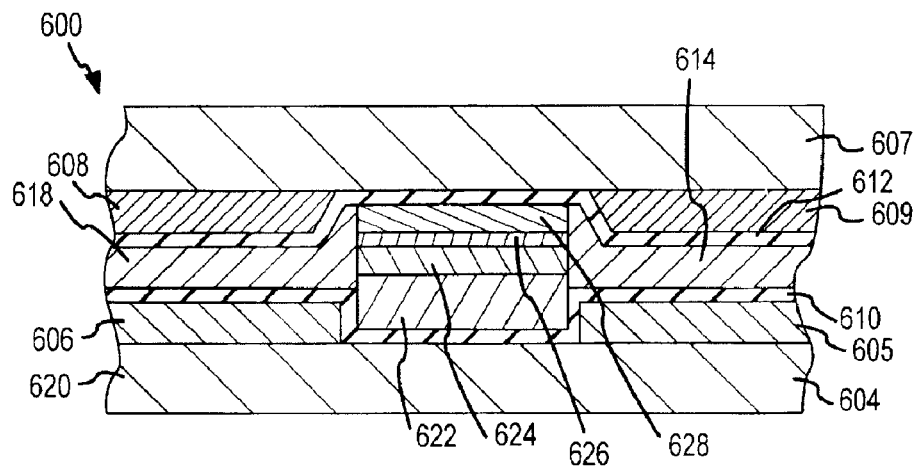
FIG. 6 is a sectional view similar to FIG. 5 illustrating an alternative embodiment of a side-shield read head with side shielding for a read sensor provided by shield extensions or extending thickness of both the top and the bottom shields.

FIG. 6 illustrates another CPP read head 600 similar to that of FIG. 5 but providing upper and lower side shield elements to further reduce the size of the effective read gaps and/or to provide shielding from side reading at the upper and the lower ends of the read sensor (i.e., portions adjacent the first and second magnetic shields). The head 600 includes bottom and top magnetic shields 604, 607; bottom and top leads 610, 612; a read sensor 620 with a pinning layer 622 (such as an anti-ferromagnet such as PdPtMn), a pinned 624 (such as a magnetic film of NiFe, CoFe, CoFeB, or the like), an interlayer 626 (such as a copper layer for CPP GMR embodiments and alumina oxide for TMR embodiments), and a free layer 628 (such as a magnetic film of NiFe, CoFe, CoFeB, or the like); and read gap elements 614, 618 that define the effective side gaps adjacent the read sensor 620.

Side shielding is provided by the inclusion of bottom side shields 605, 606 (or bottom shield extensions) positioned adjacent a lower portion of the read sensor 620 and the inclusion of top side shields 608, 609 (or top shield extensions) positioned adjacent an upper portion of the read sensor 620. Again, the side shields 605, 606, 608, and 609 are typically formed from the same material as used for the shield layers 604, 607 or another material useful for providing magnetic shielding. The thicknesses of the side shields 605, 606, 608, 609 may vary while providing adequate thickness of the read gap elements 614, 618 such as by having the thicknesses be equal, having the bottom side shields 605, 606 have thicknesses greater than the top side shields 608, 609, of having the top side shields 608, 609 being thicker than the bottom side shields 605, 606. Preferably, the top side shields 608, 609 and the lead 612 is spaced apart, such as at an angle as shown, from the side of the read sensor 620 such that a portion of the read gap elements 614, 618 abuts the sides of the read sensor 620.

Figure 7:
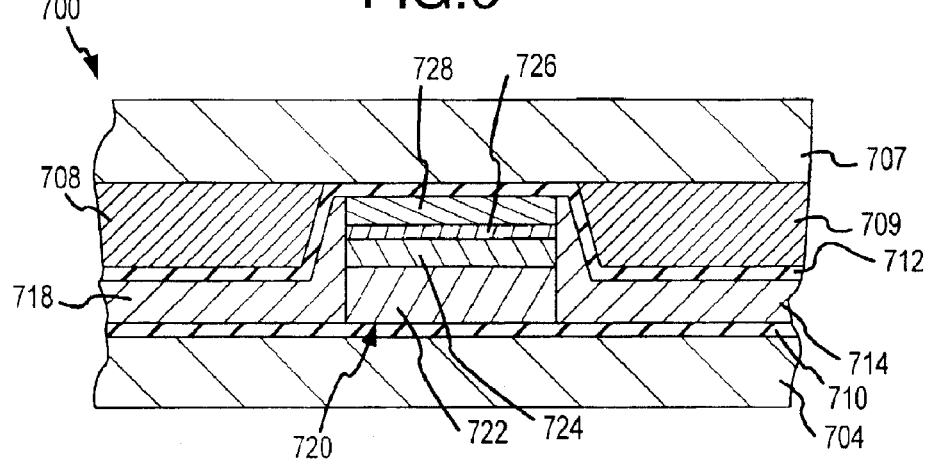
FIG. 7 is a sectional view similar to FIGS. 5 and 6 illustrating another embodiment of a side-shield read head of the invention having side shielding for a read sensor provided only by shield extensions or extending thickness of the top shield.

FIG. 7 illustrates yet another embodiment of a CPP read head 700 in which side shielding is provided solely by upper side shields or extensions from the top (or second shield layer). The head 700 includes bottom and top (or first and second) magnetic shield layers 704, 707, electrical contacts 710, 712, read gap elements 714, 718 defining read gaps or side gaps and a read sensor 720 sandwiched between the contacts 710, 712 and including a pinning layer 722 (such as an anti-ferromagnet such as PdPtMn), a pinned layer 724 (such as a magnetic film of NiFe, CoFe, CoFeB, or the like), an interlayer 726 (such as a copper layer for CPP GMR embodiments and alumina oxide for TMR embodiments), and a free layer 728 (such as a magnetic film of NiFe, CoFe, CoFeB, or the like). The side shield assembly of head 700 includes side shields 708 and 709 which may be formed separately from the shield 707 or formed as extensions of the shield 707 (such as by depositing in the same process on lead layer 712) and is formed of a magnetic shielding material, such as a soft magnetic alloy, e.g., a NiFe alloy, a CoZrNb alloy, CoNiFe alloy, and the like. Again, the upper or top contact layer 712 is spaced apart (such as at an angle or bevel as shown) from the sides of the read sensor 720 so that the adjacent side shields 708, 709 is also spaced apart from the read sensor 720. The thickness of the side shields 708, 709 (as measured normal to the shield layer 707) is preferably thick as practical to provide maximum side shielding while allowing a desired read gap insulative layer 714, 718 thickness. In a four element read sensor 720 as shown, the thickness may be about equal to or greater than the top three layers of the read sensor 720 (i.e., the pinned layer 724, the interlayer 726, and the free layer 728). Of course, the thickness may be less and still provide some beneficial shielding from side reading.

Figure 8:
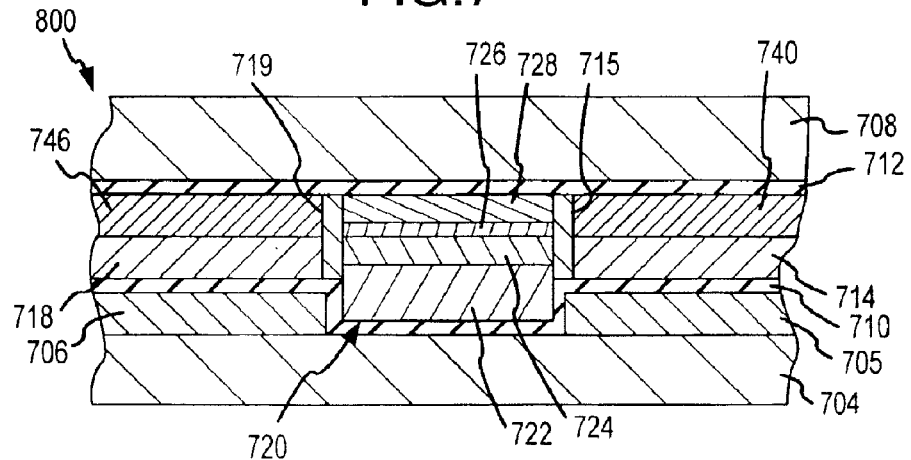
FIG. 8 is a sectional view similar to FIGS. 5–7 illustrating yet another embodiment of a side-shield read head of the invention having side shielding for a read sensor provided by shield extensions or extending thickness of the bottom shield and also illustrating the use of a hard bias or magnetic layer adjacent the read sensor.

In some cases, a hard bias layer may be provided within a CPP read head, and FIG. 8 illustrates one embodiment of a CPP read head 800 using side shielding and including a hard bias. As shown, the head 800 includes bottom and top magnetic shield layers 704, 708 and electrical contacts 710, 712 connected to a read sensor 720. The read sensor 720 includes a pinning layer 722 (such as an anti-ferromagnet such as PdPtMn), a pinned layer 724 (such as a magnetic film of NiFe, CoFe, CoFeB, or the like), an interlayer 726 (such as a copper layer for CPP GMR embodiments and alumina oxide for TMR embodiments), and a free layer 728 (such as a magnetic film of NiFe, CoFe, CoFeB, or the like). A pair of hard magnetic or bias elements 714 and 718 are built on the bottom contact 710 and abut the sides of the lower portion of the read sensor 720. Read gap elements 740, 746 are positioned on top of the bias elements 714, 718 and abut the top portion of the read sensor 720. Generally, it is preferable to include side spacers 715, 719 formed of a non-magnetic, metallic material (such as alumina) adjacent the read sensor 720 to isolate the sensor 720 from the read gap elements 740, 746 and the hard bias layers 740, 746.

The effective side gap is defined in part by the thickness of the bias elements 714, 718 and the thickness of the read gap elements 740, 746. Side shielding is provided by the inclusion of bottom side shield elements 705 and 706 which may be formed integral with the bottom shield 704 or deposited on the bottom shield 704. The side shield elements 705, 706 are formed of a magnetically shielding material such as a soft magnetic alloy, e.g., a NiFe alloy, a CoZrNb alloy, CoNiFe alloy, and the like. The side shield elements 705, 706 typically contact the lead layer 710 that abuts the lower portion of the read sensor 720 to provide a thickness of shielding (e.g., about the thickness of the pinning layer 722 or less (as shown)).

While only a read head is shown in FIGS. 3 and 5–8, it will be understood by those skilled in the art that the read heads of the invention can readily be incorporated within a merged read/write head (such as head 120 of FIG. 1). In such merged heads, a writer is built upon the top shield of read sensor which acts as the first pole (e.g., P1) of the writer. The specific configuration of the writer is not important to the side shielding features of the invention used for the described read sensors and can be any of a number of writer configurations well known in the art or yet to be created.

The CIP read head 300 is fabricated generally by providing in conventional fashion the bottom shield layer 304 and the bottom read gap layer 308. The spin valve read sensor 320 layers are then sequentially deposited (such as with vacuum deposition) and then a bi-layer photoresist liftoff pattern or mushroom is produced over the deposited stack layers. Ion beam etching or other removal techniques are used to remove deposited stack layer material except for under the photoresist pattern or mask. Material deposition continues with the non-magnetic metallic side spacers 311, 313 and the side shields 310, 312 followed by the hard bias material for layers 332, 330, and contacts 340, 342. Material lift-off is then performed on the head 300 followed by the formation of the top read gap layer 350 and magnetic shield 360 using conventional processing techniques.

Fabrication of the head 500 of FIG. 5 includes forming a bottom shield 504 with conventional techniques and then depositing material for bottom side shields 505, 506. A bi-layer photoresist pattern is formed followed by etching to form a gap for read sensor 520 and then lift-off of the photoresist material from the shields 505, 506. The bottom lead 510 is then deposited and then the read sensor 502 stack is formed as discussed with reference to FIG. 3 including a second bi-layer photoresist pattern formation and etching. The read gap elements 514, 518 are then deposited and the photoresist is lifted off. The top electrode 512 and the top shield are then formed using conventional deposition and processing techniques.

Fabrication of the head 600 of FIG. 6 proceeds similar to the head 500 except that after the read gap elements 614, 618 are deposited and lift off occurs, the top electrode 612 is deposited followed by another photoresist patterning step. The top side shields 608, 609 are then deposited and then lift off is completed. The top shield 607 is then deposited over the top side shields 608, 609 and the top electrode 612. The head 700 of FIG. 7 is formed in a manner similar to that of the head 600 with the omission of the steps required to build the bottom side shields 605, 606. The head 800 of FIG. 8 is formed in a manner similar to the head 500 of FIG. 5 with the added steps of depositing or forming of the side spacers 715, 719 prior to the deposition of the read gap elements 714, 718 and the depositing of the hard bias layers 740, 746 over the read gap elements 714, 718.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the specific materials and thicknesses of the layers described above can be varied significantly to practice the invention as will be readily appreciated by those skilled in the art.

We claim:

1. A read head for reading data from a magnetic media having a plurality of adjacent circular tracks, comprising:
    a bottom magnetic shield layer;
    a top magnetic shield layer;
    a read sensor including electrically conducting material disposed between the bottom and top magnetic shield layers configured for sensing changes in magnetic properties of a track on the magnetic media positioned under the read sensor;
    a side shield assembly positioned between the bottom and top magnetic shield layers and adjacent to the read sensor, the side shield assembly adapted to magnetically shield the read sensor from reading magnetic signals of a track adjacent to the track under the read sensor, wherein the side shield assembly includes a first side shield element that is positioned adjacent to a first side of the read sensor and that extends away from the bottom magnetic shield layer toward the top magnetic shield layer for a shielding distance and wherein the side shield assembly further includes a second side shield element that is positioned adjacent to a second side of the read sensor and that extends away from the bottom magnetic shield layer toward the top magnetic shield layer for a distance about equal to the shielding distance;
    a bottom electrical contact layer deposited over the first and second side shield elements and the bottom magnetic shield layer;
    a pair of read gap elements positioned on the bottom electrical contact layer adjacent to the first and second sides of the read sensor, and
    a top electrical contact layer positioned over the read gap elements and the read sensor.

2. The read head of claim 1, further including a pair of bias elements comprising hard magnetic material deposed adjacent the first and second sides of the read sensor between the read gap elements and the bottom electrical contact layer.

3. The read head of claim 1, wherein the side shield assembly further includes a third side shield element extending a top shielding distance from the top magnetic shield layer adjacent the first side of the read sensor and a fourth side shield element extending the top shielding distance from the top magnetic shield layer adjacent the second side of the read sensor.

4. The read head of claim 3, wherein the read gap elements abut the first and second sides of the read sensor such that the top electrical contact layer and the adjacent third and fourth side shield elements extend the top shielding distance proximal to the first and second sides of the read sensor spaced apart by the read gap elements.

5. A method of fabricating a thin film read head having improved shielding against side reading, comprising:
    providing a substrate;
    depositing a film of magnetic insulation material over the substrate to form a bottom magnetic shield layer;
    forming first and second side shield elements on the bottom magnetic shield layer, the first and second side shield elements being spaced apart for insertion of additional materials on the bottom magnetic shield layer and comprising a magnetic insulation material;
    depositing a film of electrically conductive material over the first and second side shield elements and the bottom magnetic shield layer at the space defined between the first and second side shield elements;
    forming a magnetically sensitive element on the deposited electrically conductive film between the first and second side shield elements;
    forming a pair of read gap elements adjacent sides of the magnetically sensitive element;
    depositing an additional film of electrically conductive material over the read gap elements and the magnetically sensitive element; and
    forming a top magnetic shield layer of magnetic insulation material on the additional film of electrically conductive material.

6. The method of claim 5, wherein the forming of the first and second side shield elements includes removing a portion of the magnetic insulation material of the bottom magnetic shield layer.

7. The method of claim 6, wherein the magnetic insulation material of the bottom magnetic shield layer is a soft magnetic alloy.

8. The method of claim 5, wherein the forming of the top magnetic shield layer includes forming third and fourth side shield elements of extending toward the first and second side shield elements along the sides of the magnetically sensitive element.

9. The method of claim 8, wherein the forming of the read gap elements includes patterning recesses to define the third and fourth side shield elements.

10. The method of claim 5, further including forming a pair of bias elements adjacent the sides of the magnetically sensitive element between the film of electrically conductive material and the read gap elements, the bias elements comprising a hard magnetic material.

11. A method of fabricating a thin film read head having improved shielding against side reading, comprising:
providing a substrate;
depositing a film of magnetic insulation material over the substrate to form a bottom magnetic shield layer;
forming a magnetically sensitive element on the bottom magnetic shield layer having first and second sides;
forming first and second side shield elements comprising a magnetic insulation material adjacent the first and second sides of the magnetically sensitive element;
forming a top magnetic shield layer of magnetic insulation material over the magnetically sensitive element the first and second side shield elements;
deposition a first layer of read gap material on the bottom magnetic shield layer prior to the forming of the magnetically sensitive element;
forming a pair of bias elements on the first and second side shield elements of hard magnetic material adjacent the first and second sides of the magnetically sensitive element;
forming a pair of electrical leads over the bias elements contacting the first and second sides of the magnetically sensitive element; and
depositing a second layer of read gap material over the electrical leads and the magnetically sensitive element.

12. A system for storing and retrieving digital data to and from a magnetic recording media, comprising:
a head assembly positionable adjacent the magnetic recording media comprising:
a write head; and
a read head comprising:
a bottom magnetic shield layer;
a top magnetic shield layer;
a read sensor including electrically conducting material disposed between the bottom and top magnetic shield layers configured for sensing changes in magnetic properties of a track on the magnetic media positioned under the read sensor;
a side shield assembly positioned between the bottom and top magnetic shield layers and adjacent to the read sensor, the side shield assembly adapted to magnetically shield the read sensor from reading magnetic signals of a track adjacent to the track under the read sensor, wherein the side shield assembly comprises a first layer of magnetically shielding material deposited on the bottom read gap layer adjacent to the first side of the read sensor and a second layer of magnetically shielding material deposited on the bottom read gap layer adjacent to the second side of the read sensor;
a pair of electrical contacts positioned between the bottom and top magnet shield layers contacting first and second sides of the read sensor;
a bottom read gap layer disposed between the bottom magnetic shield layer and the read sensor and the side shield assembly;
a top read gap layer disposed between the top magnetic shield layer and the read sensor and the pair of electrical contacts; and
a pair of hard magnetic elements positioned adjacent to the first and second sides of the read sensor between the first and second layers of magnetically shielding material and the electrical contacts; and
a drive device for coupling to the media so as to move the media with respect to the head assembly.

13. The system of claim 12, wherein the magnetically shielding material is selected from the group of alloys consisting of a NiFe alloy, a CoZrNb alloy, and a CoNiFe alloy.

14. A read head for reading data from a magnetic media having a plurality of adjacent circular tracks, comprising:
a bottom magnetic shield layer;
a top magnetic shield layer;
a read sensor including electrically conducting material disposed between the bottom and top magnetic shield layers that is configured for sensing changes in magnetic properties of a track on the magnetic media that is positioned under the read sensor;
a side shield assembly positioned between the bottom and top magnetic shield layers and adjacent to the read sensor, the side shield assembly being adapted to magnetically shield the read sensor from reading magnetic signals of a track that is adjacent to the track under the read sensor;
a pair of electrical contacts positioned between the bottom and top magnet shield layers and contacting first and second sides of the read sensor;
a bottom read gap layer disposed between the bottom magnetic shield layer and the read sensor and the side shield assembly;
a top read gap layer disposed between the top magnetic shield layer and the read sensor and the pair of electrical contacts, wherein the side shield assembly comprises a first layer of magnetically shielding material deposited on the bottom read gap layer adjacent to the first side of the read sensor and a second layer of magnetically shielding material deposited on the bottom read gap layer adjacent to the second side of the read sensor; and
a pair of hard magnetic elements positioned adjacent to the first and second sides of the read sensor between the first and second layers of magnetically shielding material and the electrical contacts.

15. The read head of claim 14, wherein the magnetically shielding material is selected from the group of alloys consisting of a NiFe alloy, a CoZrNb alloy, and a CoNiFe alloy.

16. A system for storing and retrieving digital data to and from a magnetic recording media, comprising:
a head assembly positionable adjacent the magnetic recording media comprising:
a write head; and
a read head comprising:
a bottom magnetic shield layer;
a top magnetic shield layer;

a read sensor including electrically conducting material disposed between the bottom and top magnetic shield layers configured for sensing changes in magnetic properties of a track on the magnetic media positioned under the read sensor;

a side shield assembly positioned between the bottom and top magnetic shield layers and adjacent the read sensor, the side shield assembly adapted to magnetically shield the read sensor from reading magnetic signals of a track adjacent the track under the read sensor, wherein the side shield assembly includes a first side shield element that is positioned adjacent to a first side of the read sensor and that extends away from the bottom magnetic shield layer toward the top magnetic shield layer for a shielding distance and wherein the side shield assembly further includes a second side shield element that is positioned adjacent to a second side of the read sensor and that extends away from the bottom magnetic shield layer toward the top magnetic shield layer for a distance about equal to the shielding distance; and a bottom electrical contact layer deposited over the first and second side shield elements and the bottom magnetic shield layer;

a pair of read gap elements positioned on the bottom electrical contact layer adjacent the first and second sides of the read sensor; and a top electrical contact layer positioned over the read gap elements and the read sensor; and a drive device for coupling to the media so as to move the media with respect to the head assembly.

17. The system of claim 16, the read head further including a pair of bias elements comprising hard magnetic material deposed adjacent to the first and second sides of the read sensor between the read gap elements and the bottom electrical contact layer.

18. The system of claim 16, wherein the side shield assembly further includes a third side shield element extending a top shielding distance away from the top magnetic shield layer adjacent to the first side of the read sensor and a fourth side shield element extending away from the top magnetic shield layer for the top shielding distance adjacent to the second side of the read sensor.

19. The system of claim 18, wherein the read gap elements abut the first and second sides of the read sensor such that the top electrical contact layer and the adjacent third and fourth side shield elements are proximal to the first and second sides of the read sensor and are spaced apart from the first and second sides of the read sensor by the read gap elements.

20. A read head for reading data from a magnetic media having a plurality of adjacent circular tracks, comprising:

a bottom magnetic shield layer;

a top magnetic shield layer;

a read sensor disposed between the bottom and top magnetic shield layers;

a side shield assembly positioned between the bottom and top magnetic shield layers and adjacent to the read sensor, the side shield assembly adapted to magnetically shield the read sensor from reading magnetic signals of a track that is adjacent to the track under the read sensor;

a bottom electrical contact layer deposited over the first and second side shield elements and the bottom magnetic shield layer;

a pair of read gap elements positioned on the bottom electrical contact layer adjacent to the first and second sides of the read sensor, and a top electrical contact layer positioned over the read gap elements and the read sensor;

wherein the side shield assembly further includes a first top side shield element positioned adjacent to the first side of the read sensor and extending away from the top magnetic shield layer toward the bottom magnetic shield layer for a shielding distance and further including a second top side shield element positioned adjacent to the second side of the read sensor and extending away from the top magnetic shield layer toward the bottom magnetic shield layer for a distance equal to about the shielding distance; and wherein the read gap elements abut the first and second sides of the read sensor such that the top electrical contact layer and the first and second top side shield elements are proximal to the first and second sides of the read sensor but are spaced apart from the read sensor by the read gap elements.

21. A read head for reading data from a magnetic media having a plurality of adjacent circular tracks, comprising:

a bottom magnetic shield layer;

a top magnetic shield layer;

a read sensor disposed between the bottom and top magnetic shield layers;

a side shield assembly positioned between the bottom and top magnetic shield layers and adjacent the read sensor, wherein the side shield assembly includes a first side shield element that is positioned adjacent to a first side of the read sensor and that extends away from the bottom magnetic shield layer toward the top magnetic shield layer for a shielding distance and wherein the side shield assembly further includes a second side shield element that is positioned adjacent to a second side of the read sensor and that extends away from the bottom magnetic shield layer toward the top magnetic shield layer for a distance about equal to the shielding distance, the first and second side shield elements being formed integrally with the bottom magnetic shield layer and comprising a magnetically insulating material; and a bottom electrical contact layer deposited over the first and second side shield elements and the bottom magnetic shield layer.

* * * * *